United States Patent [19]

Abramson et al.

[11] Patent Number: 5,748,937
[45] Date of Patent: May 5, 1998

[54] COMPUTER SYSTEM THAT MAINTAINS PROCESSOR ORDERING CONSISTENCY BY SNOOPING AN EXTERNAL BUS FOR CONFLICTS DURING OUT OF ORDER EXECUTION OF MEMORY ACCESS INSTRUCTIONS

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland, Beaverton, all of Oreg.

[73] Assignee: Intel Corporation, Santa Clara, Calif.

[21] Appl. No.: 825,417

[22] Filed: Mar. 28, 1997

Related U.S. Application Data

[63] Continuation of Ser. No. 388,150, Feb. 13, 1995, abandoned, which is a continuation-in-part of Ser. No. 112,668, Aug. 26, 1993, abandoned.

[51] Int. Cl.$^6$ ........................................... G06F 9/38
[52] U.S. Cl. ................................. 395/394; 395/477
[58] Field of Search ........................... 395/394, 395, 395/800, 473, 477, 478

[56] References Cited

U.S. PATENT DOCUMENTS

| | | | |
|---|---|---|---|
| 4,773,041 | 9/1988 | Hassler et al. | 395/421.03 |
| 4,959,777 | 9/1990 | Holman, Jr. | 395/468 |
| 4,980,824 | 12/1990 | Tulpule | 395/676 |
| 5,125,083 | 6/1992 | Fite et al. | 395/383 |
| 5,226,130 | 7/1993 | Favor et al. | 395/585 |
| 5,226,144 | 7/1993 | Moriwaki et al. | 395/448 |
| 5,261,071 | 11/1993 | Lyon | 395/467 |
| 5,280,615 | 1/1994 | Church et al. | 395/674 |
| 5,420,991 | 5/1995 | Konigsfeld et al. | 395/477 |
| 5,428,761 | 6/1995 | Herlihy et al. | 395/457 |
| 5,542,075 | 7/1996 | Ebcioglu et al. | 395/709 |

FOREIGN PATENT DOCUMENTS 1582815  1/1981  United Kingdom .............. G06F 9/00

OTHER PUBLICATIONS

V. Popescu, et al., "The Metaflow Architecture", IEEE Micro, 1991, pp. 10–13, and 63–73.

Mike Johnson, "Superscalar Microprocessor Design", Prentice Hall, pp. 31–163, 1991.

William W. Collier, "Reasoning About Parallel Architectures", Prentice Hall, 1992.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A computer system having a mechanism for maintaining processor ordering during out-of-order instruction execution is disclosed wherein load memory instructions are accessed according to program order and executed out-of-order in relation to the program order where appropriate. Processors in the system snoop an external bus for bus transactions that conflict with completed load memory instructions before committing results of the completed load memory instructions to an architectural state.

17 Claims, 8 Drawing Sheets

COMPUTER SYSTEM THAT MAINTAINS PROCESSOR ORDERING CONSISTENCY BY SNOOPING AN EXTERNAL BUS FOR CONFLICTS DURING OUT OF ORDER EXECUTION OF MEMORY ACCESS INSTRUCTIONS

This is a continuation of application Ser. No. 08/388,150 filed Feb. 13, 1995, now abandoned which is a continuation-in-part of application Ser. No. 08/112,668, filed Aug. 26, 1993, entitled Processor Ordering Consistency For a Processor Perfroming Out-of Order Instruction Execution, now abandoned.

BACKGROUND OF THE INVENTION

1. Field of the Invention

The present invention pertains to the field of computer systems. More particularly, this invention relates to processor ordering consistency during out-of-order instruction execution in a computer system.

2. Background

Inter-processor communication in a multiprocessor computer system is typically modeled as information transfer between one or more producer processors and one or more consumer processors. A producer processor in such a system usually transfers information to the consumer processors via messages stored in a shared memory. Typically, each processor in such a system conforms to a processor ordering model that ensures consistent information flow to the consumer processors. Such a processor ordering model usually requires that each consumer processor observe stores from a producer processor in the same order.

For example, such a producer processor typically writes message data to the memory, and then sets a message flag in the memory to indicate valid message data. Each consumer processor reads the message flag, and then reads the message data if the message flag indicates valid message data. A processor ordering model that requires each consumer processor to observe stores from the producer processor in the same order ensures that each consumer processor observes the message data store before the message flag store and thereby reads valid message data.

Some prior processors implement an out-of-order instruction execution pipeline. Such a processor fetches an instruction stream, and then executes ready instructions in the instruction stream ahead of earlier instructions that are not ready. A ready instruction is typically an instruction having fully assembled source data and having available execution resources. Such out-of-order execution usually improves processor performance because the instruction execution pipeline of the processor does not stall while assembling source data for a non-ready instruction.

Unfortunately, such out-of-order instruction execution in a multiprocessor system may cause violations of the obligatory processor ordering model because consumer processors that execute load instructions in differing orders may observe stores from the producer processor in differing order. For example, a consumer processor that executes a load instruction for the message flag before a load instruction for the message data effectively observes the producer processor stores to the message data and the message flag in a different order than a consumer processor that executes a load instruction for the message data before a load instruction for the message flag.

Such a violation of the processor ordering model may cause the consumer processors to read differing message data. One of the consumer processors may load the message data before the producer processor stores the message data, and may load the message flag after the producer processor stores the message flag. In such a case, the consumer processor loads invalid message data and loads a message flag indicating valid message data. As a consequence, the consumer processor erroneously processes invalid message data.

SUMMARY OF THE INVENTION

A computer system is disclosed including a processor having a mechanism for maintaining processor ordering during out-of-order instruction execution. Processors in the system access instructions according to program order and execute the instructions including load memory instructions out-of-order in relation to the program order where appropriate. The system's processors snoops an external bus for a bus transaction that conflicts with a completed load memory instruction before committing results of the completed load memory instruction to an architectural state. The processor discards the result of the completed load memory instruction and then restarts an instruction stream that includes the discarded load memory instruction to maintain ordering consistency.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
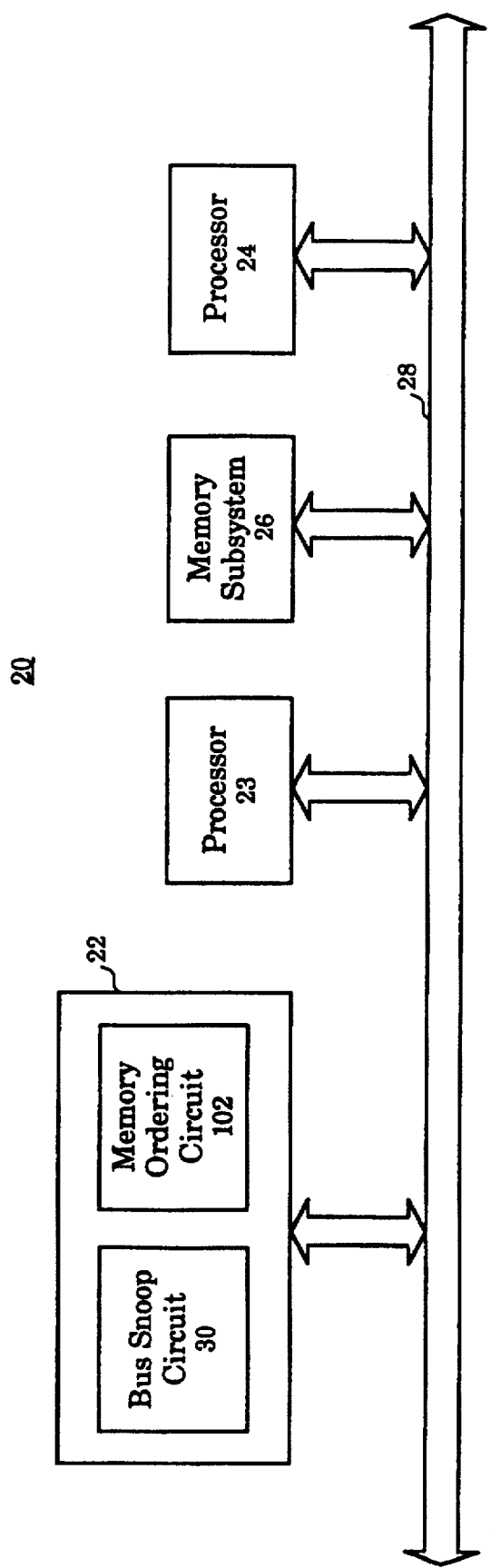
FIG. 1 illustrates a computer system comprising a set of processors and a memory subsystem.

FIG. 1 illustrates a computer system 20. The computer system 20 comprises a set of processors 22–24, and a memory subsystem 26. The processors 22–24 and the memory subsystem 26 communicate over a bus 28. Each processor 22–24 fetches a stream of instructions from the memory subsystem 26 over the bus 28. Each processor 22–24 executes the corresponding stream of instructions and maintains data storage in the memory subsystem 26. Each processor 22–24, as illustrated by the processor 22, contains a processor ordering mechanism including a bus snoop circuit and a memory ordering circuit.

Figure 2:
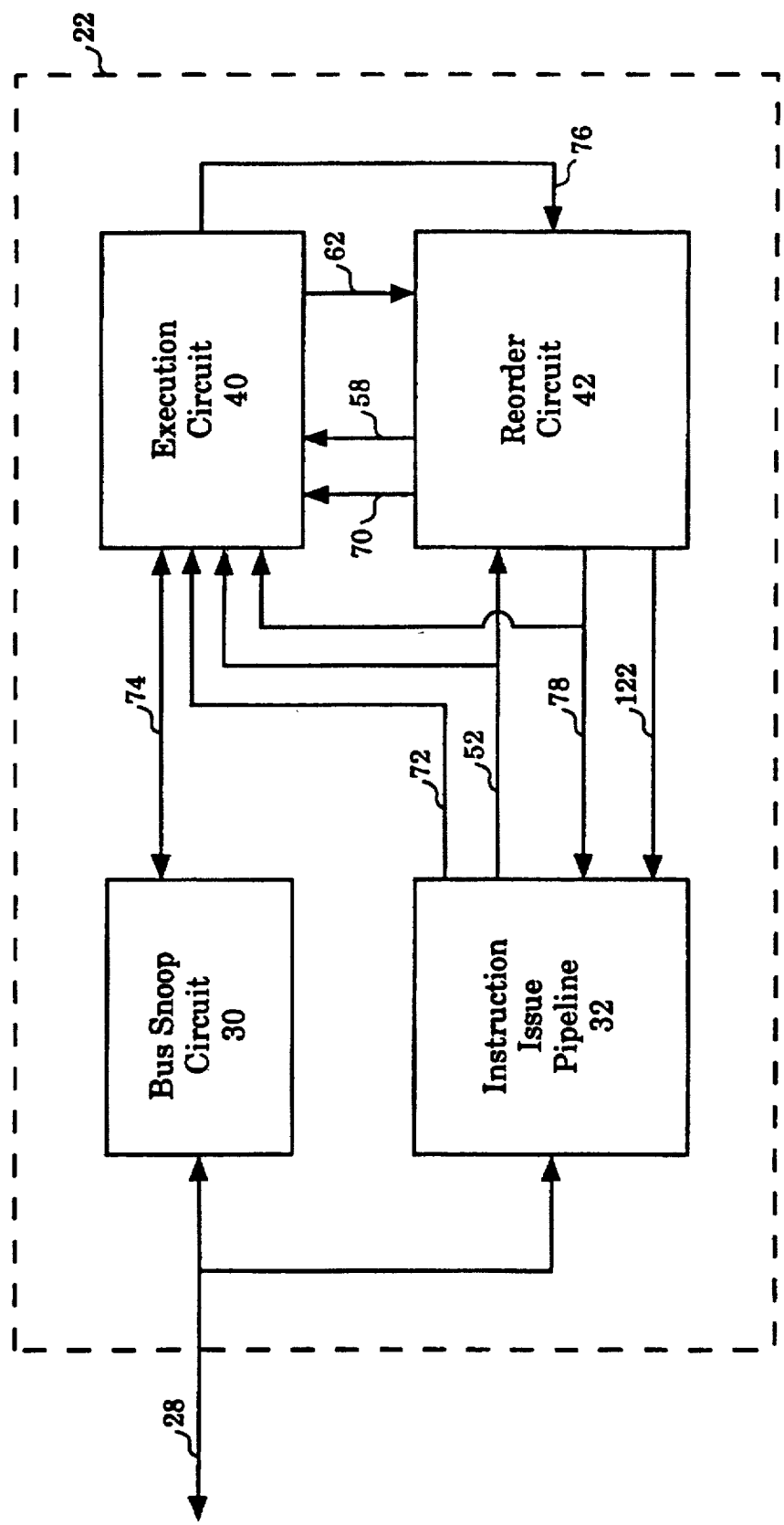
FIG. 2 illustrates a processor that includes a bus snoop circuit, an instruction issue pipeline, an execution circuit, and a reorder circuit.

FIG. 2 illustrates the processor 22 for one embodiment. The processor 22 comprises a bus snoop circuit 30, an instruction issue pipeline 32, an execution circuit 40, and a reorder circuit 42. The bus snoop circuit 30 performs snoop operations and other bus access operations over the bus 28 during execution of memory access instructions by the execution circuit 40.

The instruction issue pipeline 32 fetches an in-order stream of instructions from the memory subsystem 26 over the bus 28 and issues the instruction in-order via a bus 52. Each instruction issued by the instruction issue pipeline 32 includes an op code, a pair of sources and a destination. The register sources and destinations of the instructions on the bus 52 specify physical registers contained in the reorder circuit 42.

The instruction issue pipeline 32 assigns a load buffer entry in the execution circuit 40 to the instructions on the bus 52 that have an opcode specifying a load memory operation. The instruction issue pipeline 32 assigns the load buffer entries by transferring load buffer identifiers to the execution circuit 40 over a bus 72.

The execution circuit 40 receives the in-order instructions over the bus 52, assembles the source data for the instructions, and dispatches and executes the instructions. The execution circuit 40 writes back the speculative results from the out-of-order execution of the instructions to the reorder circuit 42 over a bus 62.

The reorder circuit 42 contains the physical registers that buffer speculative results for the executed instructions. The reorder circuit 42 also contains committed state registers that hold the committed state or architectural results for the executed instructions.

The reorder circuit 42 receives the in-order instruction stream over the bus 52. The register sources of the instructions specify physical registers in the reorder circuit 42 and committed state registers in the reorder circuit 42 that hold the source data for the instructions. The reorder circuit 42 reads the source data specified by the instruction sources, and transfers the source data to the execution circuit 40 over a bus 58.

The destinations of the instructions on the bus 52 specify physical registers in the reorder circuit 42 for buffering the speculative results of the out-of-order execution of the instructions. The reorder circuit 42 reimposes a sequential program order on the executed instructions by committing the speculative results held in the physical registers of the reorder circuit 42 to an architectural state in the same program order as the original instruction stream.

The reorder circuit 42 broadcasts a set of physical destinations over a bus 70 that indicate a set of instructions being retired or committed to architectural state. The execution circuit 40 receives the retiring physical destinations over the bus 70, and issues a set of memory ordering restart signals 76 that indicate whether a memory load operation corresponding to one of the retiring instructions has caused a possible processor ordering violation.

If the memory ordering restart signals 76 indicate a possible processor ordering violation, the reorder circuit 42 issues a reorder clear signal 78. The reorder circuit 42 also clears the speculative result data for unretired instructions including the instruction specified by the memory ordering restart signals 76 and unretired instructions that occur after the instruction specified by the memory ordering restart signals 76 in the program order. The reorder clear signal 78 causes the execution circuit 40 to clear pending instructions that await execution. The reorder circuit 42 calculates a restart instruction pointer value that specifies the instruction that caused the possible memory ordering violation, and transfers the restart instruction pointer value to the instruction issue pipeline 32 over a bus 122.

The instruction issue pipeline 32 contains a micro instruction sequencer and an associated control store that includes micro programs for performing processor ordering recovery. The reorder clear signal 78 causes the micro-instruction sequencer of the instruction issue pipeline 32 to reissue the in order stream of instructions starting at the instruction address specified by the restart instruction pointer value.

If the memory ordering restart signals 76 do not indicate a possible processor ordering violation, then the retirement of the physical registers specified by the retiring physical destinations on the bus 70 proceeds. The reorder circuit 42 retires a physical register by transferring the speculative result data to committed state registers.

Figure 3:
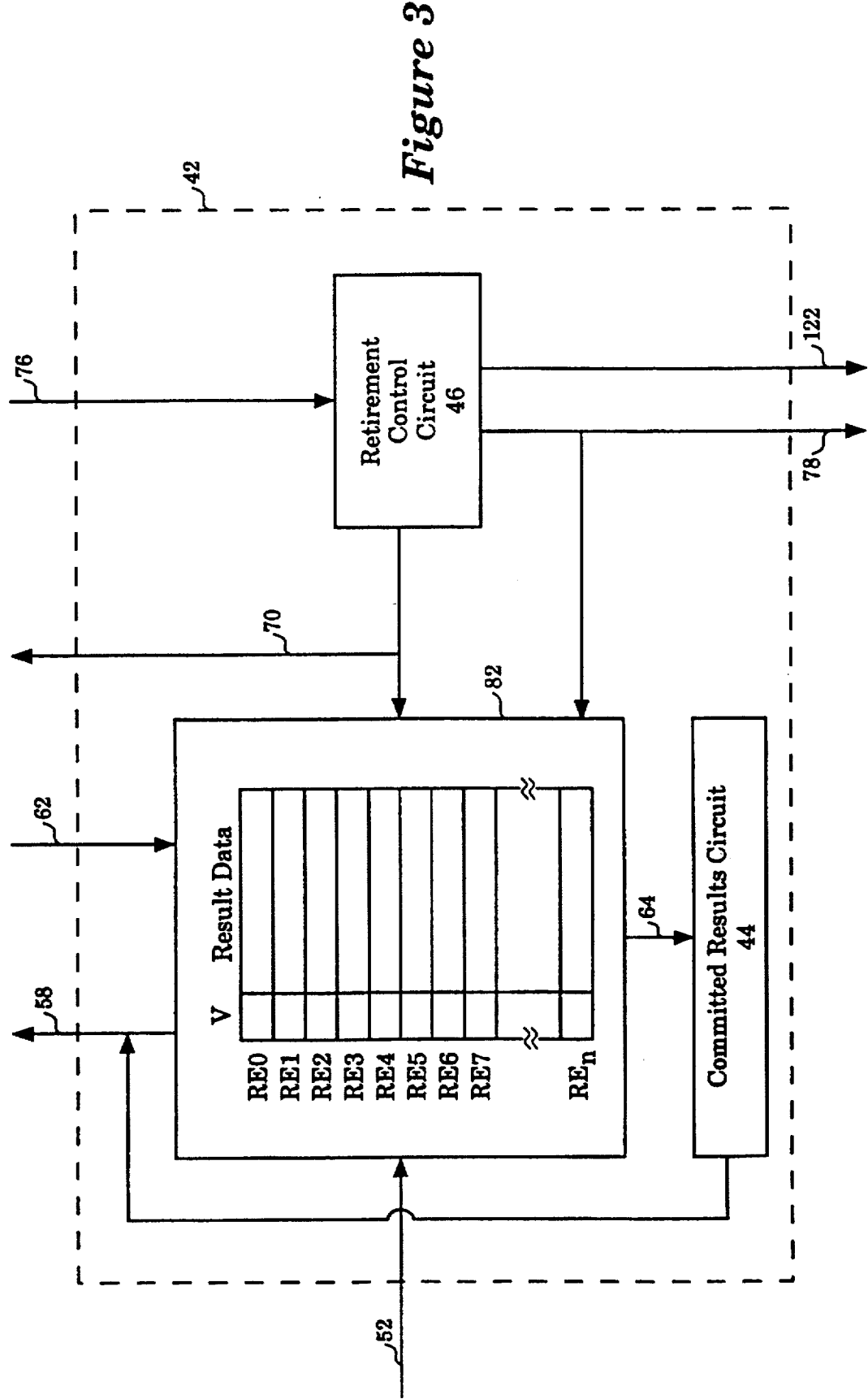
FIG. 3 illustrates the reorder circuit which contains a reorder buffer, a committed results circuit, and a retirement control circuit.

FIG. 3 illustrates the reorder circuit 42 for one embodiment. The reorder circuit 42 contains a reorder buffer 82, a committed results circuit 44, and a retirement control circuit 46.

The reorder buffer 82 comprises a set of ROB entries (RE0 through REn). The ROB entries RE0 through REn are physical registers that buffer result data from instruction execution. Each ROB entry includes a valid flag (V) and a result data value. The valid flag indicates whether the corresponding result data value is valid. The reorder circuit 42 receives write back speculative result information and corresponding valid flags from the execution circuit 40 over the bus 62.

The reorder circuit 42 supplies the appropriate result data values and the valid flags from the ROB entries as source data to the execution circuit 40 via the bus 58. In addition, the committed results circuit supplies committed result data values as source data via the bus 58.

The reorder circuit 42 receives a set of retiring physical destinations over the bus 70 from the retirement control circuit 46. The retirement physical destinations cause the reorder circuit 42 to commit the speculative result data values specified on the bus 70 to architectural state by transferring the speculative result data values to committed result registers contained in a committed result circuit 44 over a bus 64.

Figure 4:
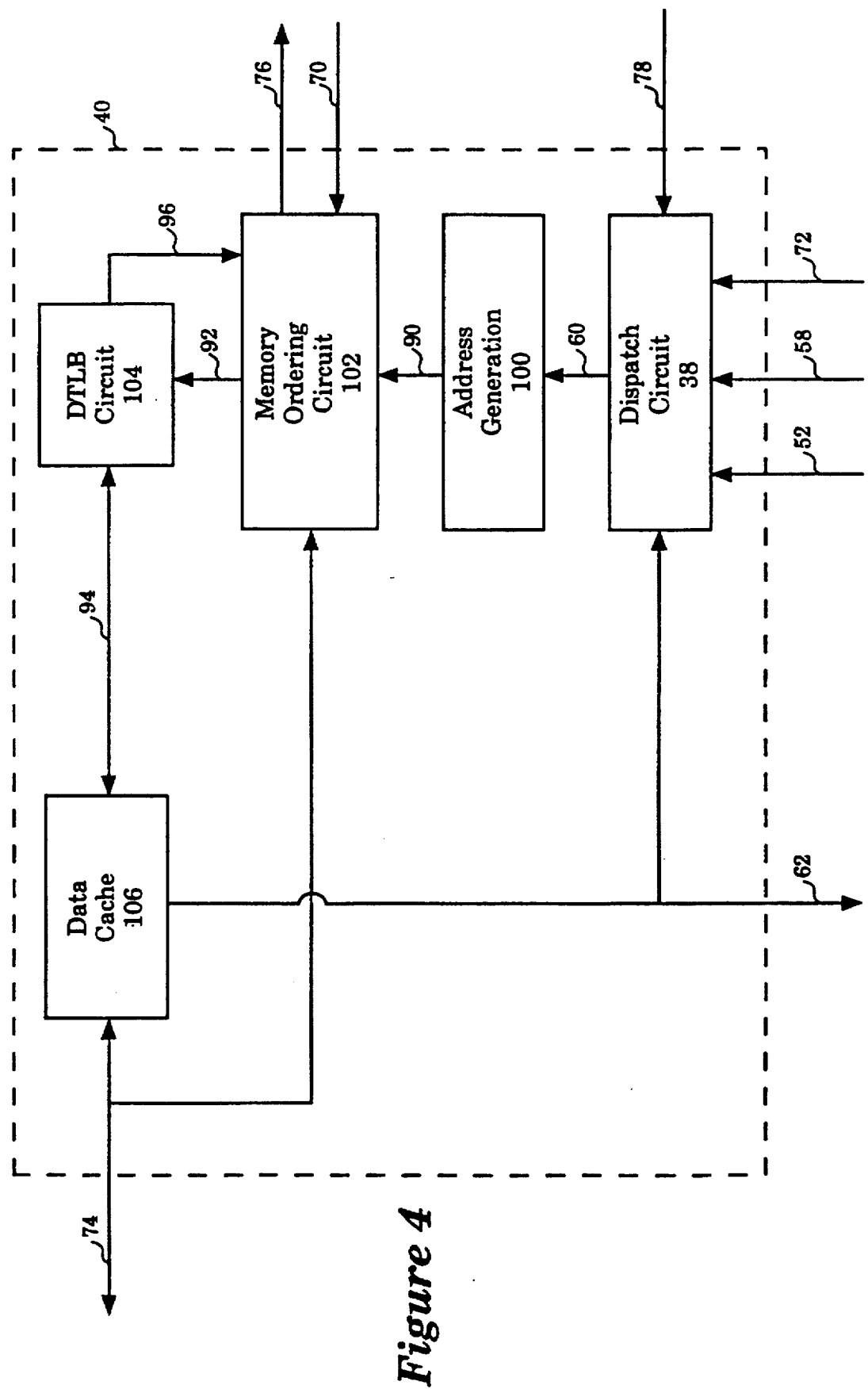
FIG. 4 illustrates the execution circuit which includes a dispatch circuit, a memory ordering circuit, and a data cache.

FIG. 4 illustrates the execution circuit 40. The execution circuit 40 comprises a dispatch circuit 38, an address generation circuit 100, a memory ordering circuit 102, a data translate look-aside buffer (DTLB) circuit 104, and a data cache circuit 106.

The dispatch circuit 38 receives instructions over the bus 52 and stores the instructions in internal dispatch buffer entries. The dispatch circuit 38 assembles source data for the instructions, and dispatches the instructions for execution. The dispatch circuit 38 receives the source data for the pending instructions from the reorder circuit 42 over the bus 58 and over the bus 62 during a write back of speculative results to the reorder circuit 42.

The dispatch circuit 38 schedules the instructions having completely assembled source data for execution. The dispatch circuit 38 dispatches the ready instructions over a bus 60. The dispatch circuit 38 schedules the execution of instructions out-of-order according to the availability of the source data, and according to the availability of resources in the execution circuit 40.

The address generation circuit 100 receives dispatched load memory instructions from the dispatch circuit 38 over the bus 60. Each dispatched load memory instruction comprises an opcode, a pair of source data values src1_data and src2_data, a physical destination pdst in the reorder circuit 42, and a load buffer identifier lbid. The address generation circuit 100 determines a linear address for each dispatched load memory physical micro-op according to the source data values src1_data and src2_data. The linear address may also be referred to as a virtual address.

The address generation circuit 100 transfers linear load memory instructions to the memory ordering circuit 102 over a bus 90. Each linear load memory operation on the bus 90 corresponds to a dispatched load memory instruction received over the bus 60. Each linear load memory micro-op comprises the opcode of the corresponding load memory instruction, the linear address 1_addr determined from the corresponding source data values src1_data and src2_data, the corresponding physical destination pdst, and the corresponding load buffer identifier lbid received via the bus 72.

The memory ordering circuit 102 contains a load buffer that stores the linear load memory instructions. The memory ordering circuit 102 dispatches the linear load memory instructions from the load buffer to the DTLB circuit 104 over the bus 90.

The DTLB circuit 104 provides a physical address to the data cache circuit 106 over a bus 94 for each linear load memory instruction received from the memory ordering circuit 102. The DTLB circuit 104 converts the corresponding linear address 1_addr into a physical address for the memory subsystem 26.

The DTLB circuit 104 transfers the mapped physical address corresponding linear address 1_addr of each linear load memory to the memory ordering circuit 102 over a bus 96. The memory ordering circuit 102 stores the physical addresses for each linear load memory instruction in the corresponding load buffer entry. For one embodiment, the memory ordering circuit 102 stores a portion of the physical addresses for each linear load memory instruction in the corresponding load buffer entry.

The data cache circuit 106 reads the data specified by the physical address on the bus 94. If the physical address causes a cache miss, the data cache circuit 106 fetches the required cache line from the memory subsystem 26. The data cache circuit 106 receives cache lines from the memory subsystem 26 over a bus 74 through the bus snoop circuit 30 which is coupled to the bus 28. The data cache circuit 106 transfers the read result data, a corresponding valid bit, and fault data for the read access to the reorder circuit 42 and the dispatch circuit 38 over the result bus 62.

The memory ordering circuit 102 senses or "snoops" bus cycles on the multiprocessor bus 28 through the bus snoop circuit 30 over the bus 74. The memory ordering circuit 102 "snoops" the bus 28 for an external store or read for ownership operation by one of the processors 23-24 that may cause a processor ordering violation for one of the dispatched linear load memory instructions. The memory ordering circuit 102 "snoops" the bus 28 for an external store operation targeted for the physical address of an already dispatched linear load memory instruction stored in the load buffer.

During retirement of each load memory physical instruction, the memory ordering circuit 102 generates the memory ordering restart signals 76 to indicate a possible processor ordering violation according to the snoop detection.

Figure 5:
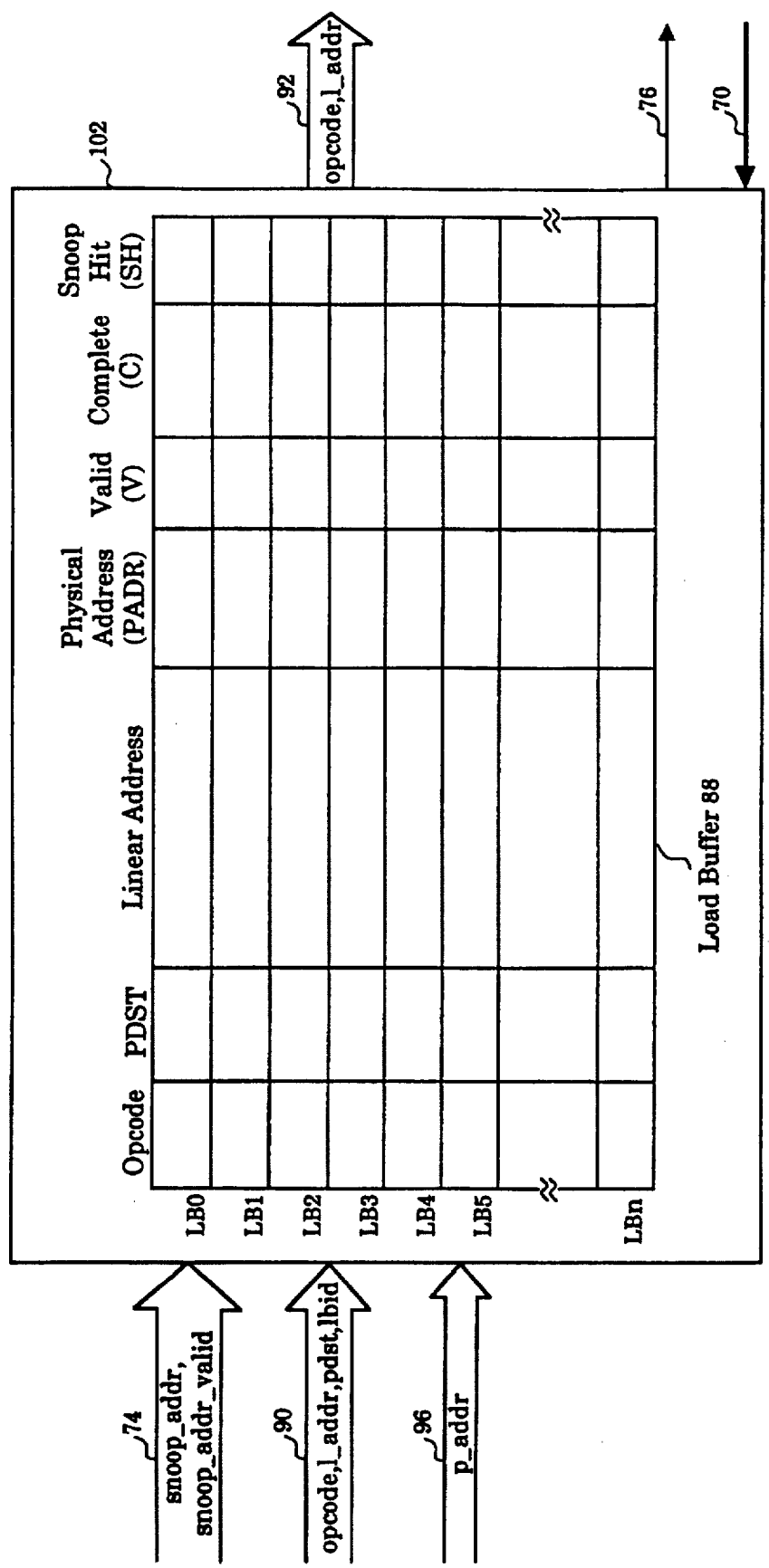
FIG. 5 illustrates a load buffer contained in the memory ordering circuit for one embodiment which comprises a set of load buffer entries LB0 through LBn.

FIG. 5 illustrates a load buffer 88 contained in the memory ordering circuit 102 for one embodiment. The load buffer 88 comprises a set of load buffer entries LB0 through LBn. Each load buffer entry LB0 through LBn holds a linear load memory instruction from the address generation circuit 100. Each buffer entry LB0 through LBn comprises an opcode, a physical destination (PDST), a linear address, a set of physical address bits (PADR), a valid flag (V), a complete flag (C), and a snoop hit flag (SH).

The memory ordering circuit 102 receives the linear load memory instructions over the bus 60. The memory ordering circuit 102 stores each linear load memory instruction into a load buffer entry LB0 through LBn specified by the corresponding load buffer identifier lbid. The memory ordering circuit 102 sets a "valid" status for each new linear load memory instruction in the load buffer 88. The "valid" status indicates that the corresponding load buffer entry LB0 through LBn holds an unretired load memory instruction.

The memory ordering circuit 102 stores the opcode, the physical destination pdst, and the linear address 1_addr of each linear load memory instruction into the corresponding fields of the load buffer entry LB0 through LBn specified by the load buffer identifier lbid of the linear load memory instruction. The load buffer identifiers are generated by the instruction issue pipeline 32 and are transferred through the dispatch circuit 38 via the bus 72.

The memory ordering circuit 102 receives the physical addresses p_addr corresponding to the linear load memory instructions from the DTLB circuit 104 over the bus 96. The memory ordering circuit 102 stores the physical address for each linear load memory instruction into the physical address field of the corresponding load buffer entry LB0 through LBn. For one embodiment, the physical addresses on the bus 96 comprise bits 12 through 19 of the physical address generated by the DTLB circuit 104 for the corresponding linear load memory instructions.

The memory ordering circuit 102 dispatches the linear load memory instructions from the load buffer entries LB0 through LBn over the bus 90 according to the availability of resources in the DTLB circuit 104. The memory ordering circuit 102 sets a "complete" status for each linear load memory instruction dispatched to the DTLB circuit 104.

The memory ordering circuit 102 "snoops" the bus 28 for external store operations that may cause a processor ordering violation. The memory ordering circuit 102 "snoops" the bus 28 for external stores to one of the physical addresses specified the load buffer entries LB0 through LBn having "complete" status. The memory ordering circuit 102 receives an external physical address snoop_addr and a corresponding snoop_addr_valid signal from the bus snoop circuit 30 over the bus 74. The snoop_addr_valid signal specifies a valid address for a store operation on the bus 28.

For one embodiment, the physical address on the bus 28 comprises 40 bits (bits 0 through 39). Bits 0 through 11 of the linear address for a linear load memory micro-op equal bits 0 through 11 of the corresponding physical address. The memory ordering circuit 102 detects a processor ordering "snoop hit" by comparing bits 5 through 11 of the physical address of external store operations on the bus 28 with bits 5 through 11 of the linear address of the load buffer entries LB0 through LBn having "complete" status. The memory ordering circuit 102 also compares bits 12 through 19 of the physical address of external store operations on the bus 28 with the physical address bits 12 through 19 of the load buffer entries LB0 through LBn having "complete" status.

The memory ordering circuit 102 sets the snoop hit flag for the load buffer entries LB0 through LBn causing a processor ordering snoop hit. The memory ordering circuit 102 does not set the snoop hit flag if the load buffer entry LB0 through LBn causing a processor ordering snoop hit holds the oldest linear load memory micro-op in the load buffer 88.

The memory ordering circuit 102 receives the retiring physical destinations over the bus 70. The memory ordering circuit 102 issues the memory ordering restart signals 76 to indicate a possible processor ordering violation if one of the load buffer entries LB0 through LBn specified by the retiring physical destinations has the corresponding snoop hit flag set.

Figure 6:
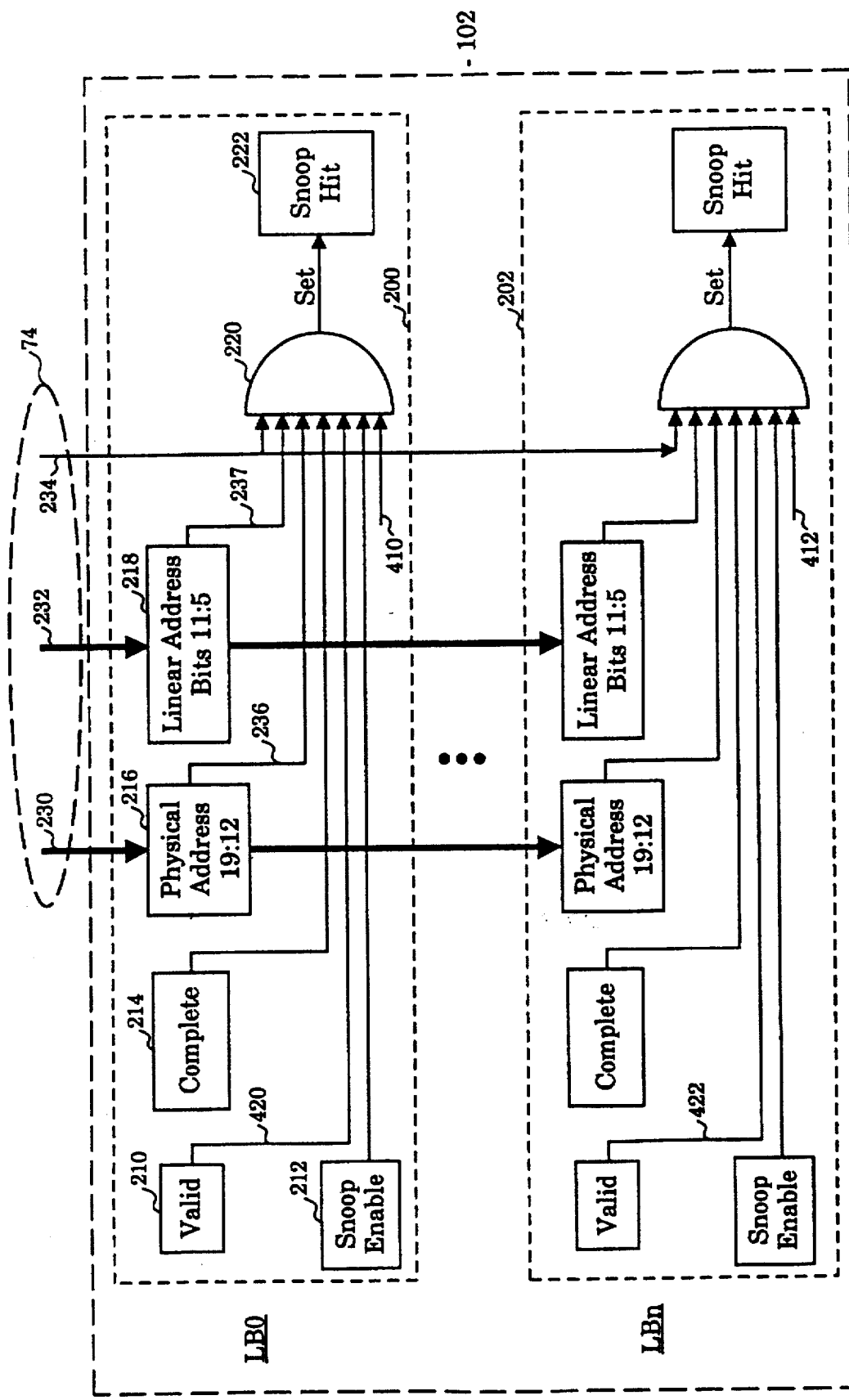
FIG. 6 illustrates the snoop detection circuitry in the memory ordering circuit which includes a snoop detect circuit corresponding to each load buffer entry LB0-LBn.

FIG. 6 illustrates the snoop detection circuitry in the memory ordering circuit 102. The snoop detection circuitry includes a snoop detect circuit corresponding to each load buffer entry LB0-LBn in the memory ordering circuit 102.

For example, a snoop detect circuit 200 corresponds to the load buffer entry LB0. The snoop detect circuit 200 comprises a valid register 210, complete register 214, a physical address register 216, a linear address register 218, a snoop enable register 212, and a snoop hit register 222.

The valid register 210 contains the "valid" status indicating whether the load buffer entry LB0 contains a valid load memory operation. The complete register 214 holds the "complete" status indicating whether the load memory operation for the corresponding load buffer entry LB0 has dispatched. The physical address register 216 holds the physical address bits 19–12 corresponding to the load buffer entry LB0. The linear address register 218 stores bits 11–5 of the linear address for the load memory operation corresponding to the load buffer entry LB0. The snoop enable register 212 holds a snoop enable flag that enables or disables external store snooping for the load buffer entry LB0.

The physical address register 216 receives a set of snoop address bits 230. The snoop address bits 230 comprise bits 19–12 of the snoop_addr received over the bus 74. The physical address register 216 asserts a physical address detect signal 236 if the physical address bits 230 equal the physical address bits 19–12 corresponding to the load buffer entry LB0.

The linear address register 218 receives a set of physical address bits 232. The physical address bits 232 comprise bits 11–5 of the snoop_addr received over the interface bus 74. The linear address register 218 generates a linear address detect signal 237 if the physical address bits 232 equal bits 11–5 of the linear address corresponding to the load buffer entry LB0.

A snoop_addr_valid signal 234 is received over the interface bus 74. The snoop_addr_valid signal 234 indicates that the snoop_addr on the interface bus 74 corresponds to a valid external store operation. The output of an AND gate 220 sets a snoop hit flag in the snoop hit register 222 by combining the physical address detect signal 236, and the linear address detect signal 237, the "complete" and the "valid" status," the snoop enable flag, and a signal 410 that indicates whether the entry LB0 is the oldest load memory micro-op in the load buffer 88.

Figure 7:
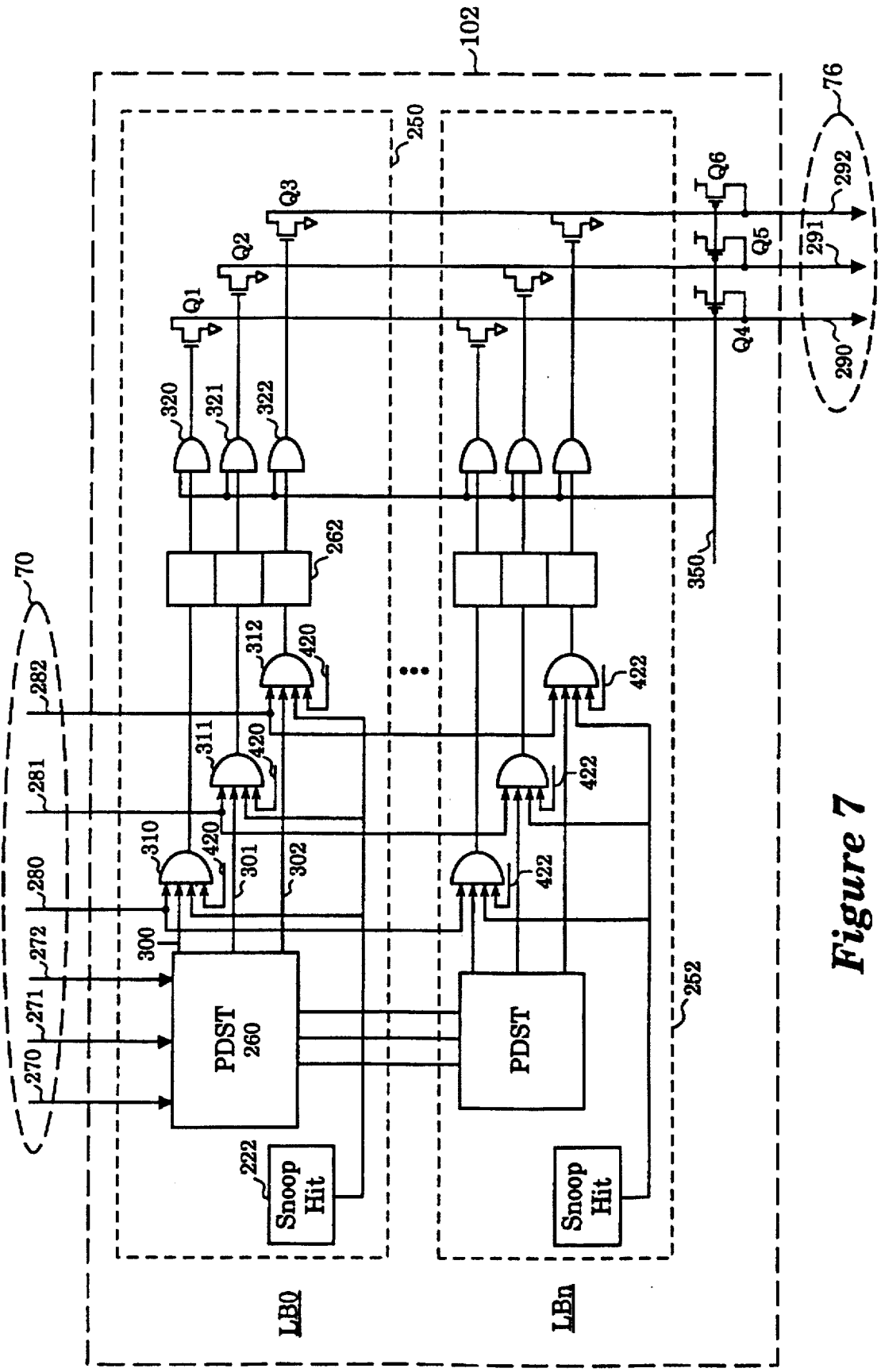
FIG. 7 illustrates notification circuitry in the memory ordering circuit that generates the memory ordering restart signals.

FIG. 7 illustrates notification circuitry in the memory ordering circuit 102 that generates the memory ordering restart signals 76. The memory ordering circuit 102 contains a notification circuit for each of the load buffer entries LB0-LBn.

For example, the notification circuit 250 corresponds to the load buffer entry LB0. The snoop hit register 222 contains the snoop hit flag for the load buffer entry LB0. A physical destination (PDST) register 260 holds the physical destination corresponding to the load buffer entry LB0.

The PDST register 260 receives a set of physical destinations 270–272 over the bus 70 indicating the next set of retiring instructions. The PDST register 260 generates a set of control signals 300–302. The control signals 300–302 indicate whether any of the physical destinations 270–272 match the physical destination in the load buffer entry LB0.

For example, the PDST register 260 generates the control signal 300 to indicate that the physical destination 270 matches the physical destination in load buffer entry LB0. Similarly, the PDST register 260 generates the control signal 301 to indicate that the physical destination 271 matches the physical destination in load buffer entry LB0, and the control signal 302 to indicate that the physical destination 272 matches the physical destination in load buffer entry LB0.

The memory ordering restart circuit 250 receives a set of physical destination valid flags 280–282 over the bus 70 from the retirement control circuit 46. The retirement physical destination valid flags 280–282 indicate whether the retirement physical destinations 270–272 are valid and correspond to retiring instructions.

For example, the physical destination valid flag 280 indicates whether the physical destination 270 is valid, the physical destination valid flag 281 indicates whether the retirement destination 271 is valid, and the physical destination valid flag 282 indicates whether the physical destination 272 is valid.

The control signals 300–302 and the retirement physical destination flags 280–282 are combined with the snoop hit flag by a set of AND gates 310–312. The outputs of the AND gates 310–312 are stored in a register 262. The outputs of the register 262 are synchronized by a clock signal 350.

The register 262 stores the memory ordering restart flags for the load buffer entry LB0. The outputs of the AND gates 320–322 control a set of pull down transistors Q1, Q2 and Q3. The pull down transistors Q1, Q2 and Q3 are coupled to a set of memory ordering restart signal lines 290–292. The memory ordering restart signal lines 290–292 are also coupled to a set of pull up transistors Q4, Q5 and Q6 which are synchronized by the clock signal 350.

If the control signal 300 indicates that the physical destination 270 matches the physical destination in load buffer entry LB0, and if the physical destination valid flag 280 indicates that the physical destination 270 is valid, and if the snoop hit flag for the load buffer entry LB0 is set, then the output of the AND gate 320 switches on the transistor Q1. The transistor Q1 pulls down the voltage on the memory ordering restart signal line 290 to indicate that the instruction specified by the physical destination 270 has caused a possible processor ordering violation.

Similarly, the memory ordering restart signal line 291 indicates that the instruction specified by the physical destination 271 has caused a possible processor ordering violation, and the memory ordering restart signal line 292 indicates that the instruction specified by the physical destination 272 has caused a possible processor ordering violation.

Figure 8:
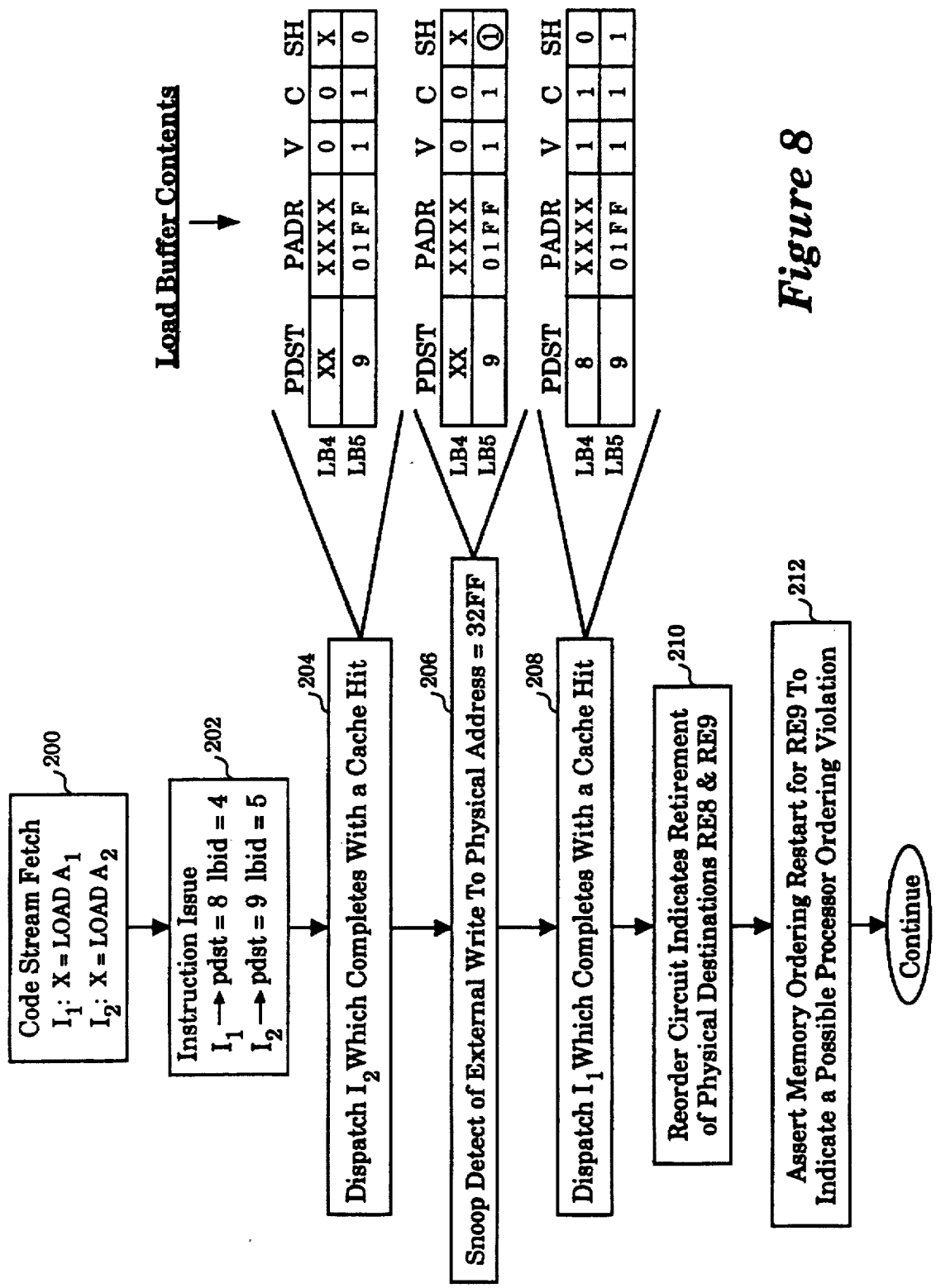
FIG. 8 illustrates the detection of a possible processor ordering violation during out-of-order instruction execution by a processor in a computer system.

FIG. 8 illustrates the detection of a possible processor ordering violation during out-of-order instruction execution in the computer system 20. At block 200, the processor 22 fetches an instruction stream that includes a pair of load instructions $I_1$ and $I_2$ that specify load addresses $A_1$ and $A_2$ respectively.

At block 202, the instruction issue pipeline 32 issues instructions $I_1$ and $I_2$ via the bus 52. The instruction issue pipeline 32 allocates a physical destination pdst=8 and a load buffer entry lbid=4 to the instruction $I_1$. Accordingly, entry RE8 in the reorder buffer 82 is allocated for buffering results for $I_1$ and load buffer entry LB4 is allocated to detect possible processor ordering violations between completion and retirement of $I_1$. Similarly, the instruction issue pipeline 32 allocates a physical destination pdst=9 and a load buffer entry lbid=5 to the instruction $I_2$ which specify entry RE9 in the reorder buffer 82 and load buffer entry LB4 for $I_2$.

At block 204, the dispatch circuit 38 dispatches the instruction 12 for execution ahead of the instruction $I_1$. The instruction 12 load operation at address $A_2$ causes a hit to the data cache 106. As shown, the contents of load buffer entry LB5 for instruction $I_2$ indicate a valid and a complete load instructions without a snoop hit (SH=0) and the physical address bits saved in LB5 comprise PADR=01FF hex.

Thereafter at block 206, the memory ordering circuit 102 detects an external write on the bus 28 to physical address 32FF hex. The external write may result, for example, from an execution by the processor 23 of a code stream comprising Q=WRITE $A_2$ and Z=WRITE $A_1$. The external write to address 32FF hex causes the memory ordering circuit 102 to set a snoop hit (SH=1) indication in load buffer entry LB5 since only a subset of the address bits of external snoops are checked against load buffer entries.

At block 208, the dispatch circuit 38 dispatches the instruction $I_1$ and the load operation to address $A_1$ causes a hit to the data cache 106. As shown, the contents of load buffer entry LB4 for instruction $I_1$ indicate a valid and a complete load instruction without a snoop hit (SH=0).

At block 210, the reorder circuit 42 indicates the start of retirement for physical destinations RE8 and RE9 of the reorder buffer 82 by broadcasting physical destinations pdst=8 and pdst=9 over the bus 70. At block 212, the memory ordering circuit 102 signals a memory ordering restart for the physical destination RE9 of the reorder buffer 82 via the memory ordering restart signals 76 to indicate a possible processor ordering violation for the instruction $I_2$. The memory ordering restart signals 76 cause the reorder circuit 42 to abort retirement of physical destination RE9 and to clear out remaining unretired entries in the reorder buffer 82. The reorder circuit 42 then transfers an appropriate restart address to the instruction issue pipeline 32 to restart the instruction stream with the instruction $I_2$.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system that executes a load memory instruction out-of-order in relation to a program order and that promotes a result of the load memory instruction to a committed state according to the program order, the computer system comprising:
   a memory subsystem including a cache memory device coupled to a bus;
   a load buffer for saving at least a partial copy of a source address of the load memory instruction, and
   a snoop circuit coupled to the bus and the load buffer for detecting a transaction on the bus that conflicts with the load memory instruction using the saved at least partial copy of the source address as long as the result of the load memory instruction has not been promoted to the committed state.

2. The computer system of claim 1, wherein the transaction is a write transaction on the bus to the same source address.

3. The computer system of claim 1, wherein the source address is a physical address.

4. The computer system of claim 1, wherein the load buffer stores a subset of bits of the source address.

5. The computer system of claim 1, wherein the computer system further comprises a reordering circuit for promoting results of out-of-order executed instruction including the result of the load memory instruction to the committed state in program order, and a notification circuit coupled to the load buffer, the snoop circuit and the reordering circuit for notifying the reordering circuit to cancel the result of the load memory instruction and restart an instruction stream including the load memory instruction if a conflicting transaction was detected by the snoop circuit.

6. The computer system of claim 5, wherein the reordering circuit provides associated address information for out-of-order executed instructions to the notification circuit while results are being considered for promotion to the committed state, and the notification circuit notifies the reordering circuit to cancel and restart when the result of the load memory instruction is being considered by the reordering circuit for promotion to the committed state.

7. An apparatus, comprising:
   a memory subsystem having a cache memory coupled to a bus;
   a load buffer for saving at least a partial copy of a source address of a load memory instruction while the load memory instruction is executed out-of-order in relation to a program order of the load memory instruction and before a result of the load instruction is promoted to a committed state; and
   a snoop circuit that, coupled to the bus and the load buffer for detecting a transaction on the bus that conflicts with the load memory instruction until the result of the load memory instruction is promoted to a committed state.

8. The apparatus of claim 7, wherein the transaction is a write transaction on the bus to the source address of the load memory instruction.

9. The apparatus of claim 7, wherein the load buffer stores a subset of bits of the source address.

10. The apparatus of claim 7, further comprising a reordering circuit for promoting results of out-of-order executed instructions including the result of the load memory instruction to the committed state in program order, and a notification circuit coupled to the load buffer, the snoop circuit and the rendering circuit for notifying the rendering circuit to cancel the result of the load memory instruction and restart an instruction stream that includes the load memory instruction if a conflicting transaction was detected by the snoop circuit.

11. The apparatus of claim 10, wherein the reordering circuit provides associated address information for out-of-order executed instructions to the notification circuit while results are being considered for promotion to the committed state, and the notification circuit notifies the reordering circuit to cancel and restart an instruction stream containing the load memory instruction when the result of the load memory instruction is being considered by the reordering circuit for promotion to the committed state.

12. A method for processor ordering in a computer system, the method comprising the steps of:
   executing a load memory instruction out-of-order in relation to a program order;

saving at least a partial copy of a source address of the load memory instruction in a load buffer while the load memory instruction is executed out-of-order and before a result of the load memory instruction is promoted to a committed state;

snooping a bus for a transaction that conflicts with the at least partial copy of the source address of the load memory instruction saved in the load buffer; and discarding the result of the load memory instruction before the result is promoted to the committed state if the transaction that conflicts with the at least partial copy of the source address of the load memory instruction is detected.

13. The method of claim 12, wherein the step of snooping a bus for a transaction that conflicts with the at least partial copy of the source address of the load memory instruction comprises the step of snooping the bus for a write transaction to an address that corresponds to the at least partial copy of the source address of the load memory instruction.

14. The method of claim 12, further comprising the step of promoting a result of the load instruction to a committed state according to the program order via a reordering circuit provided a conflicting transaction is not detected during the step of snooping.

15. The method of claim 12, wherein the step of saving at least a partial copy of a source address comprises the step of saving at least a partial copy of a physical address on the bus that corresponds to the load memory instruction.

16. The method of claim 15, wherein the step of saving at least a partial copy of a physical address comprises the step of saving a subset of bits of the physical address in the load buffer.

17. The method of claim 12, further comprising restarting an instruction stream that includes the load memory instruction if the transaction that conflicts is detected.

* * * * *

UNITED STATES PATENT AND TRADEMARK OFFICE
CERTIFICATE OF CORRECTION

PATENT NO.    : 5,748,937
DATED         : May 5, 1998
INVENTOR(S)   : Abramson et al.

It is certified that error appears in the above-identified patent and that said Letters Patent is hereby corrected as shown below:

Column 9,
Lines 11 and 12, delete "12" and insert -- $I_2$ --.

Signed and Sealed this

Twenty-fourth Day of June, 2003

JAMES E. ROGAN
*Director of the United States Patent and Trademark Office*